United States Patent
Deiters et al.

(10) Patent No.: US 8,157,216 B2
(45) Date of Patent: Apr. 17, 2012

(54) METHODS AND APPARATUS FOR AN ASYMMETRICAL FAIRING

(75) Inventors: Thomas A. Deiters, San Diego, CA (US); Tomoya Ochinero, Hermosa Beach, CA (US); James C. Newman, III, Starkville, MS (US)

(73) Assignee: ATA Engineering, Inc., San Diego, CA (US)

( * ) Notice: Subject to any disclaimer, the term of this patent is extended or adjusted under 35 U.S.C. 154(b) by 1040 days.

(21) Appl. No.: 12/165,357

(22) Filed: Jun. 30, 2008

(65) Prior Publication Data

US 2009/0321562 A1    Dec. 31, 2009

(51) Int. Cl.
 *B64G 1/00* (2006.01)
(52) U.S. Cl. ............... 244/158.1; 244/158.9; 244/159.1; 244/130
(58) Field of Classification Search ............... 244/158.1, 244/130, 159.1, 158.9, 171.7, 1 N, 198, 35 A, 244/134 A
See application file for complete search history.

(56) References Cited

U.S. PATENT DOCUMENTS

| | | | | |
|---|---|---|---|---|
| 2,980,370 A | * | 4/1961 | Takacs | 244/130 |
| 7,219,859 B2 | * | 5/2007 | Johnson et al. | 244/159.1 |
| 7,837,154 B2 | * | 11/2010 | Trabandt et al. | 244/159.1 |
| 2008/0078884 A1 | * | 4/2008 | Trabandt et al. | 244/171.7 |
| 2008/0105783 A1 | * | 5/2008 | Laflin | 244/1 N |

OTHER PUBLICATIONS

ERC SIMCENTER, SimCenter 2007 Calendar, Released 2006, Mississippi.
SIMCENTER, SimCenter 2008 Calendar, Released 2007, Mississippi.

* cited by examiner

*Primary Examiner* — Tien Dinh
*Assistant Examiner* — Philip J Bonzell
(74) *Attorney, Agent, or Firm* — Ingrassia Fisher & Lorenz, P.C.

(57) ABSTRACT

A fairing includes three sections: an aft section, a middle section, and a nose section. The aft section includes a first surface having a generally constant conic angle (i.e., a "boat-tail angle") with respect to the longitudinal axis such that the aft section tapers to a first end configured to attach to a generally cylindrical body. The middle section, which intersects and is axially aligned with the aft section, has a second surface characterized by a constant elliptical cross-section along a plane orthogonal to the longitudinal axis. The nose section intersects and is axially aligned with the middle section. The nose section is further defined by four generally concave trianguloid surfaces, each extending from the middle section to a common apex intersecting the longitudinal axis, wherein each adjacent pair of trianguloid surfaces intersects at an edge (e.g., an incurvate edge). The four trianguloid surfaces are asymmetrically disposed with respect to rotational symmetry about the longitudinal axis, and the edges have a sharpness that varies from the common apex to the middle section.

6 Claims, 6 Drawing Sheets

METHODS AND APPARATUS FOR AN ASYMMETRICAL FAIRING

STATEMENT REGARDING FEDERALLY SPONSORED RESEARCH OR DEVELOPMENT

This invention was made with United States Government support under Contract Number FA9453-05-C-0055 awarded by the United States Air Force. The United States Government has certain rights in the invention.

FIELD OF THE INVENTION

The present invention generally relates to aerospace vehicle surfaces, and more particularly relates to fairings—such as payload fairings—used in connection with aircraft, rockets, and the like.

BACKGROUND OF THE INVENTION

A "fairing" is an auxiliary structure of a vehicle, such as a rocket or spacecraft launch vehicle, that serves to reduce aerodynamic, or hydrodynamic, drag or otherwise affect one or more fluid dynamic properties of the vehicle. In many cases such fairings are used to safely enclose a payload, e.g. one or more spacecraft, for transport. It is thus often desirable to design the fairing to enclose the greatest possible volume. At the same time, however, it is necessary to ensure that the fairing fulfills certain predetermined design criteria—e.g., criteria related to mechanical characteristics, thermal characteristics, aerodynamic characteristics, minimization of fairing weight for a given payload, and any number of other design variables. Optimization therefore centers on balancing these competing considerations.

Fairings typically have one of a variety of traditional nose-cone shapes, such as conic, bi-conic, ogive, elliptical, parabolic, etc. Such shapes are generally symmetrical, or, more particularly, axisymmetric (exhibiting rotational symmetry about an axis). Unfortunately, traditional fairing shapes such as these do not always provide the best basis for optimization.

Accordingly, it is desirable to provide fairing shapes that are capable of enclosing payloads of various sizes and shapes while remaining within the applicable design criteria. Other desirable features and characteristics of the present invention will become apparent from the subsequent detailed description of the invention and the appended claims, taken in conjunction with the accompanying drawings and this background of the invention.

BRIEF SUMMARY OF THE INVENTION

In accordance with one embodiment of the present invention, a fairing includes three sections: an aft section, a middle section, and a nose section. The aft section includes a first surface having a generally constant conic angle (i.e., a "boat-tail angle") with respect to the longitudinal axis such that the aft section tapers to a first end configured to attach to a generally cylindrical body. The middle section, which intersects and is axially aligned with the aft section, has a second surface characterized by a constant elliptical cross-section along a plane orthogonal to the longitudinal axis. The nose section intersects and is axially aligned with the middle section. The nose section is further defined by four generally concave trianguloid surfaces, each extending from the middle section to a common apex intersecting the longitudinal axis, wherein each adjacent pair of trianguloid surfaces intersects at an edge (e.g., an incurvate edge). The four trianguloid surfaces are asymmetrically disposed with respect to rotational symmetry about the longitudinal axis, and the edges have a sharpness that varies from the common apex to the middle section. In this way, drag and other in-flight forces can be reduced while providing an enclosure for large payloads.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The present invention relates to an advantageous asymmetrical fairing design. In this regard, the following detailed description is merely exemplary in nature and is not intended to limit the invention or the application and uses of the invention. Further, there is no intention to be bound by any theory presented in any part of this document. For the sake of brevity, conventional techniques related to spacecraft or launch vehicle design, solid geometry, and fluid dynamics will not be described in detail.

The following description may refer to elements or components of a fairing being "connected" or "coupled" together. As used herein, unless expressly stated otherwise, "connected" means that one element/node/feature is directly joined to (or directly communicates with) another element/node/feature, and not necessarily mechanically joined. Likewise, unless expressly stated otherwise, "coupled" means that one element/node/feature is directly or indirectly joined to (or directly or indirectly communicates with) another element/node/feature. The term "exemplary" is used in the sense of "example", rather than "model". Although the figures may depict example arrangements of elements, additional intervening elements, devices, features, or components may be present in an embodiment of the invention.

Figure 1:
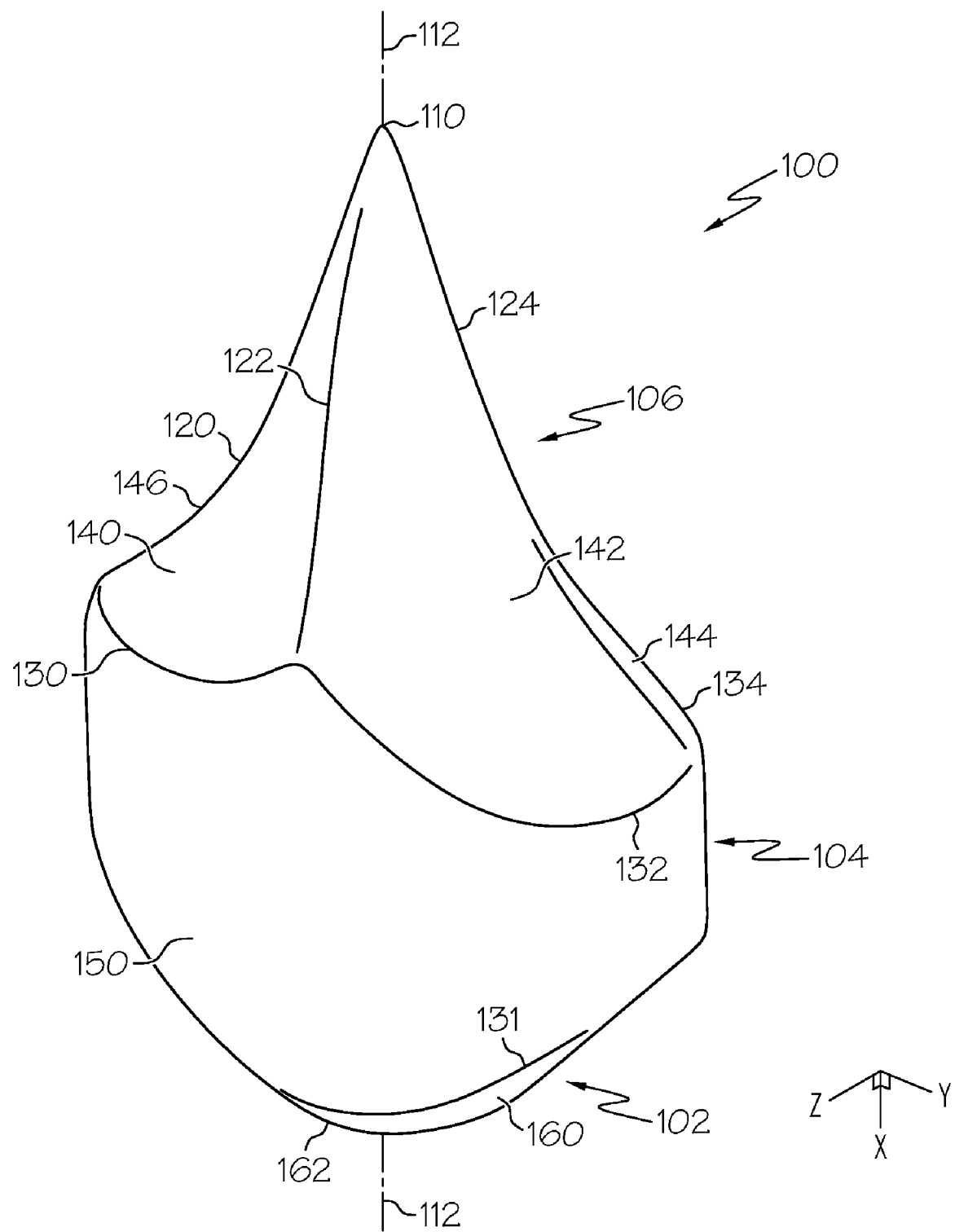
FIG. 1 is an isometric overview of an exemplary fairing in accordance with one embodiment of the invention.
Figure 2:
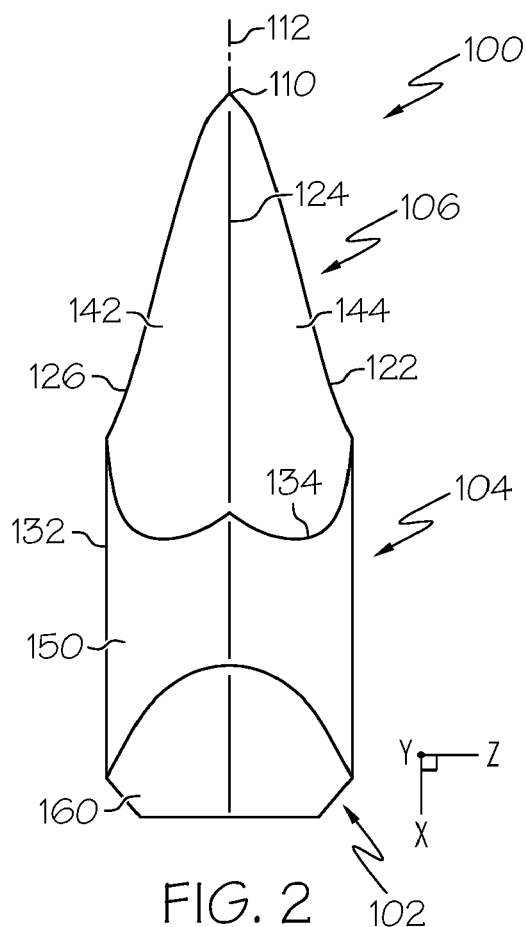
FIG. 2 is a side view of the exemplary fairing shown in FIG. 1
Figure 3:
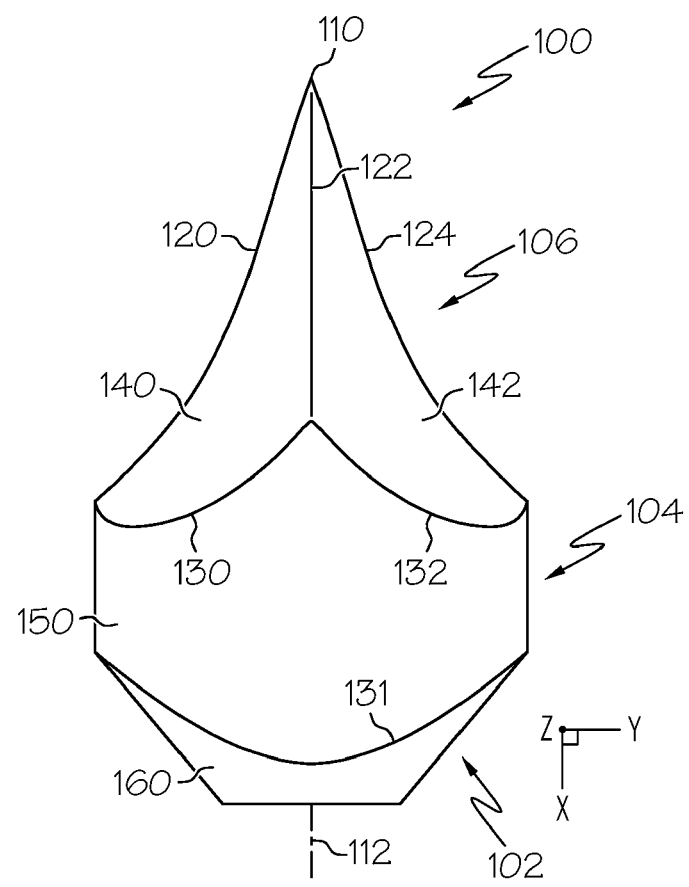
FIG. 3 is a second side view corresponding to the exemplary fairing shown in FIG. 2.

Referring to the isometric overview shown in FIG. 1 and the corresponding side views shown in FIGS. 2 and 3, a fairing 100 in accordance with the present invention generally includes three integrated sections: an aft section 102, a middle section 104, and a nose section 106. As shown, each of the three sections are axially aligned with respect to a longitudinal axis 112, which is generally parallel with the intended in-flight airstream direction. Sections 102, 104, and 106 are preferably continuous and intersect at a number of edges, as described in further detail below.

Aft section 102 includes a first surface 160 having a generally constant conic angle with respect to longitudinal axis 112 such that aft section 102 tapers to a circular end 162 configured to attach to a generally cylindrical body. That is, with brief reference to FIG. 4, end 162 of aft section 102 may be secured to a generally cylindrical body 402, e.g., a rocket, missile, projectile, or the like, such that it has a constant conic angle 406. The term "conic angle" as used herein refers to what is often termed the "boat-tail angle" of the structure, which relates to how "quickly" middle section 104 transitions to body 402. In one embodiment, for example, conic angle 406 is less than approximately 15 degrees. In another, conic angle 406 is between approximately 30 and 45 degrees.

Referring again to FIGS. 1-3, middle section 104 of fairing 100 intersects and is axially aligned with aft section 102. Middle section 104, in the illustrated embodiment, has a surface 150 characterized by a constant elliptical cross-section along a plane orthogonal to longitudinal axis 112 (i.e., the Z-Y plane designated in FIG. 1). As is known, an ellipse is defined by the locus of planar points for which the sum of the distances to two fixed points (foci) are constant, and is characterized by a major axis and a minor axis. In FIG. 1, for example, the elliptical cross section of middle section 104 has a major axis parallel to the Y-axis and a minor axis parallel to the Z-axis.

Thus, aft section 102 and middle section 104 join at an edge 131 that is a closed, non-planar curve defined by the intersection of a cone (i.e., aft section 102) and a cylinder having an elliptical base (i.e., middle section 104) where the central axis of the cylinder is aligned with that of the cone. Edge 131 may be rounded, sharp, or have any suitable geometry, and its shape may vary or be constant.

Nose section 106 intersects and is axially aligned with middle section 104, and includes four generally concave trianguloid surfaces 140, 142, 144, and 146 (the latter not visible in FIG. 1). As used herein, "trianguloid" means a shape that is similar to, but not necessarily mathematically equivalent to, a triangle. In the illustrated embodiment, for example, surface 142 has three curved sides (edges 124, 122, and 132), and can be considered trianguloid notwithstanding the fact that its sides are curves and its overall shape is non-planar.

Each of the trianguloid surfaces 140, 142, 144, and 146 extend from middle section 104 (edges 130, 132, 134, 136) to a common apex point or apex region 110 that intersects longitudinal axis 112. Note that while apex 110 is generally illustrated as a sharp point in the drawings, it may in various embodiments be rounded, flattened, or have any arbitrary shape.

Each adjacent pair of trianguloid surfaces intersects at an edge. Surface 142 intersects with surface 140 at an edge 122, surface 142 intersects with surface 144 at an edge 124, and so on. In this way, four edges (120, 122, 124, and 126 (shown in FIGS. 2 and 3)) are formed.

The fairing is asymmetrical in the sense that the four trianguloid surfaces 140, 142, 144, and 146 are asymmetrically disposed with respect to rotational symmetry about longitudinal axis 112. Stated another way, nose section 106 is not axisymmetric as is often observed in cones or other shapes that exhibit rotational symmetry about an axis. At the same time, however, nose section 106 has reflectional symmetry with respect to both the X-Z plane and the X-Y plane. That is, for example, surfaces 142 and 140 are together mirrored by surface 144 and 146.

Surfaces 140, 142, 144, and 146 are, in one embodiment, concave or "scalloped", as illustrated. The depth of this concavity may vary depending upon design considerations. Consequently, edges 120, 122, 124, and 126 may have a variety of shapes (e.g. linear, curvilinear, etc). In one embodiment, for example, the concavity of surfaces 140, 142, 144, and 146 is accompanied by a set of edges 120, 122, 124, and 126 that are "incurvate" (e.g., non linear and curved inward toward longitudinal axis 112). The curvature of these edges may be constant, monotonic, or may vary as a function of distance along longitudinal axis 112.

Figure 5:
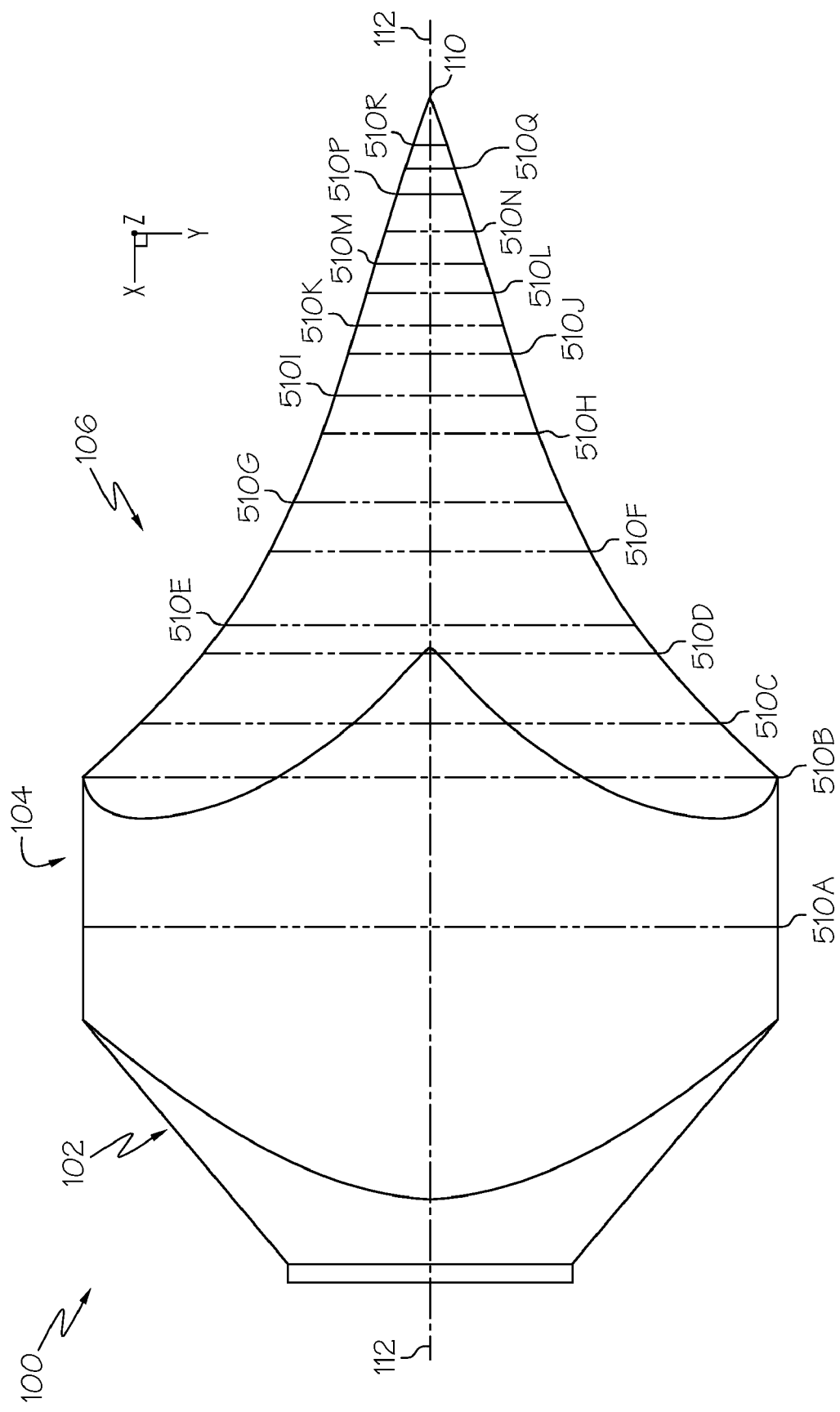
FIG. 5 is a side view of an exemplary fairing useful in describing the cross-sectional features of the various sections of the embodiment.
Figure 6:
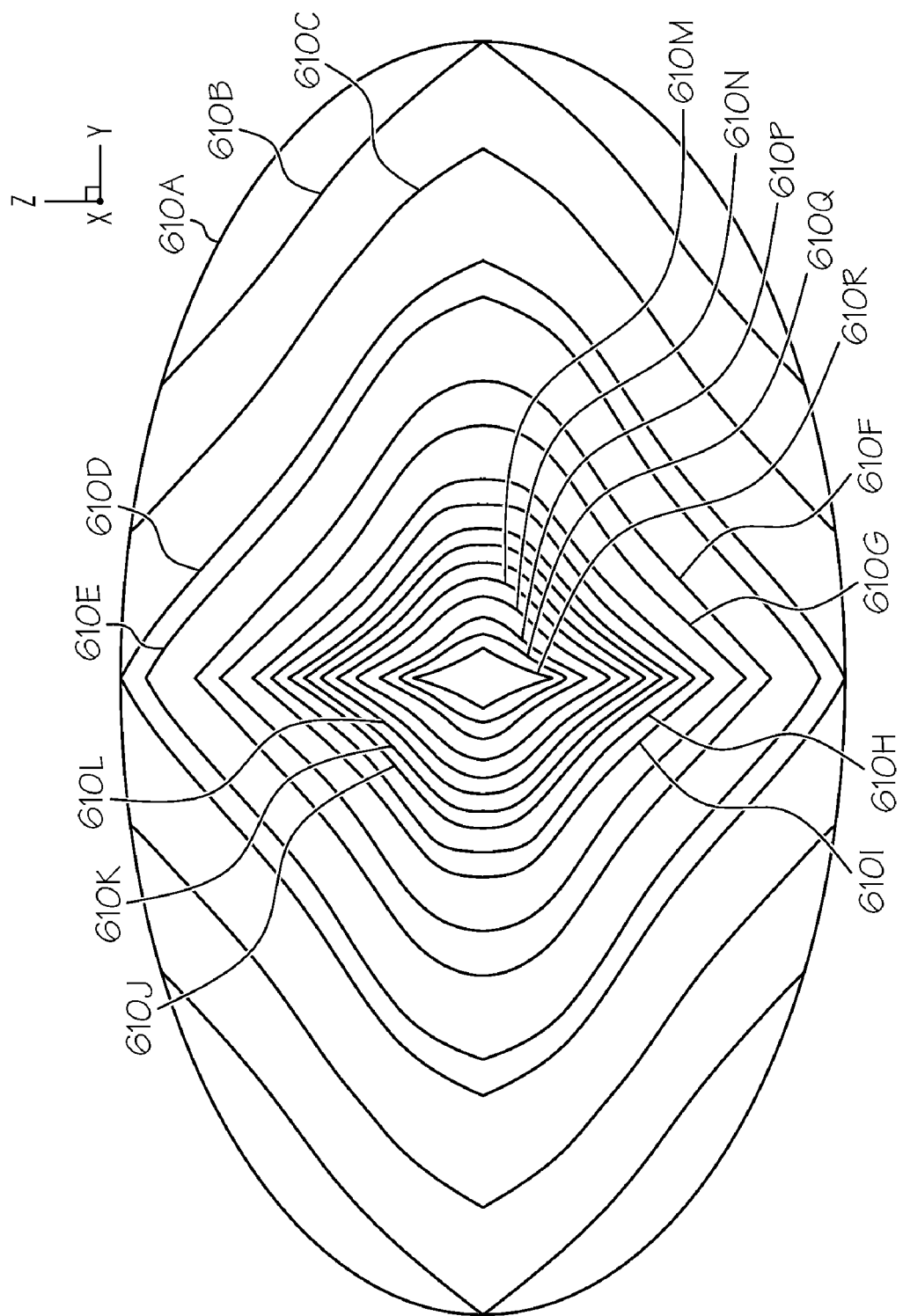
FIG. 6 shows a set of end-on cross-sectional profiles corresponding to FIG. 5.
Figure 7:
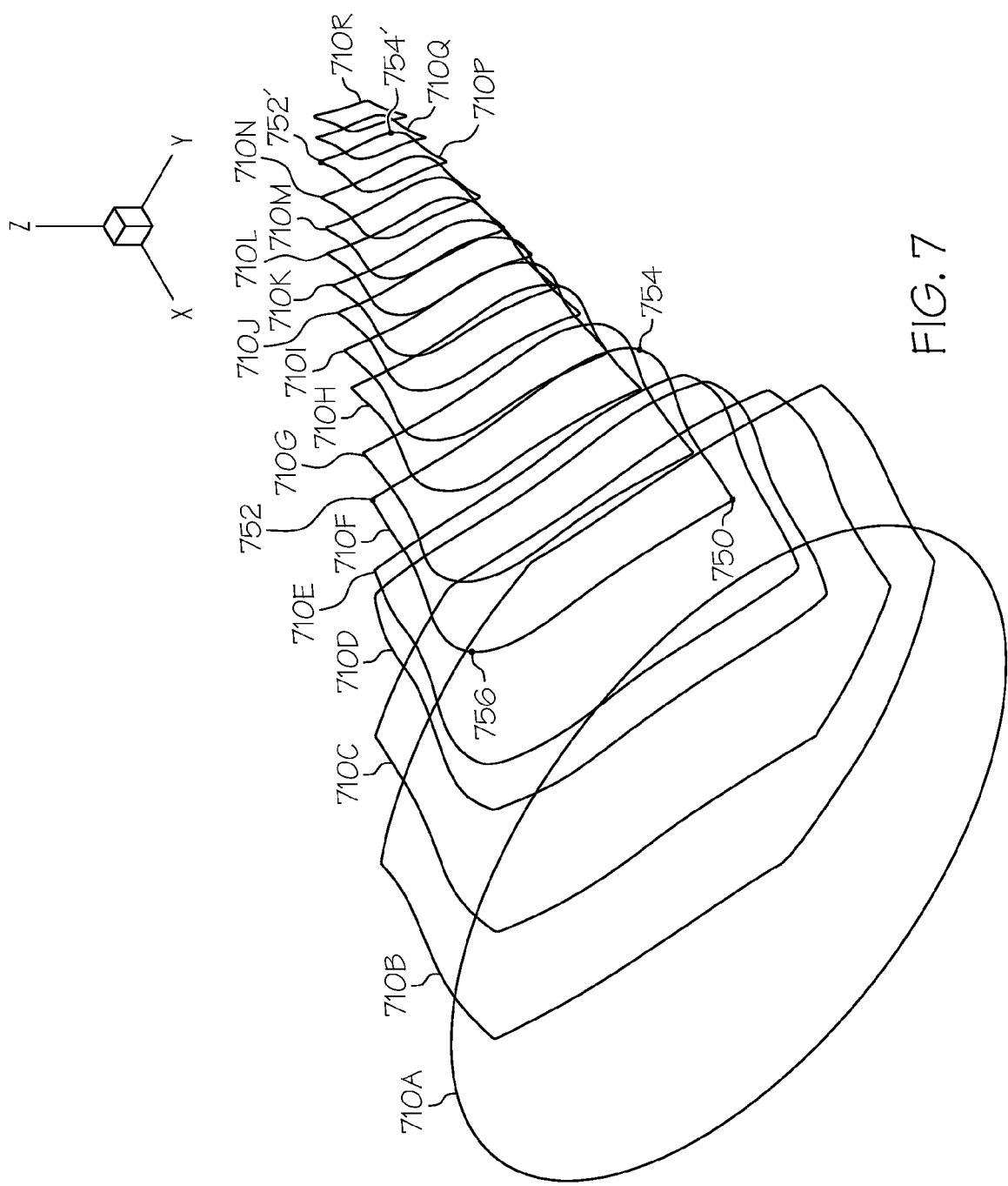
FIG. 7 is an isometric view of the profiles shown in FIG. 6.

In one embodiment, edges 120, 122, 124, and 126 have a sharpness that varies between the common apex 110 and the middle section 104. This is best seen in FIGS. 5-7, which depict the shape of various cross-sections along the length of fairing 100, and thus present a series of "slices" that assist in visualizing the geometry of the fairing. The series of cross-sections 610A-610R in FIG. 6 correspond sequentially to indicators 510A-510R of FIG. 5. Likewise, isometrically viewed cross-sections 710A-710R correspond sequentially to the indicators shown in FIG. 5.

It can be seen that the sharpness of the edges between adjacent trianguloid surfaces (described in detail above) varies as a function of the distance along fairing 100 (i.e., the x coordinate). For example, points 750, 752, 754, and 756 correspond to section 510F, which is approximately a third of the way along nose section 106 (i.e., from middle section 104). Points 752 and 750 lie along edges 122 and 126, respectively, and points 754 and 756 lie along edges 120 and 124, respectively. As illustrated, point 752' lies upon a portion of edge 122 that is significantly "sharper" than that of point 752. At the same time, however, edge 120 has a sharpness that is substantially the same at both points 754 and 754' or which increases while approaching point 110. This sharpness may be characterized, for example, by measuring the angle between tangent lines on both sides of an edge at arbitrarily small distances from that edge.

The particular dimensions of sections 102, 104, and 106 may vary depending upon desired flight characteristics, the nature and size of the payload, and the dimensions of the rocket or other body to which it is being attached. In one embodiment, the major axis dimension of the elliptical cross-section of middle section 104 is approximately 1.5 to 4.0 times its minor axis. In another embodiment, the total height of fairing 100, extending from apex 110 to end 162, is approximately 1.5 to 4.0 times the major axis dimension of middle section 104. The cylindrical body to which fairing 100 attaches might, for example, have a diameter that is approximately half of the major axis dimension of middle section 104. In one embodiment, the diameter of the body 402 at 162 is approximately 0.35 to 1.0 times the length of section 104 along the x-axis.

As illustrated in FIG. 3, in one embodiment the intersection of the three edges 130, 132, and 122 is closer to tip 110 than the point where edges 124 and 120 intersect edge 130 and 132. Stated another way, the total length of edges 120 and 124 are greater than the total length of edges 122 and 126.

Figure 4:
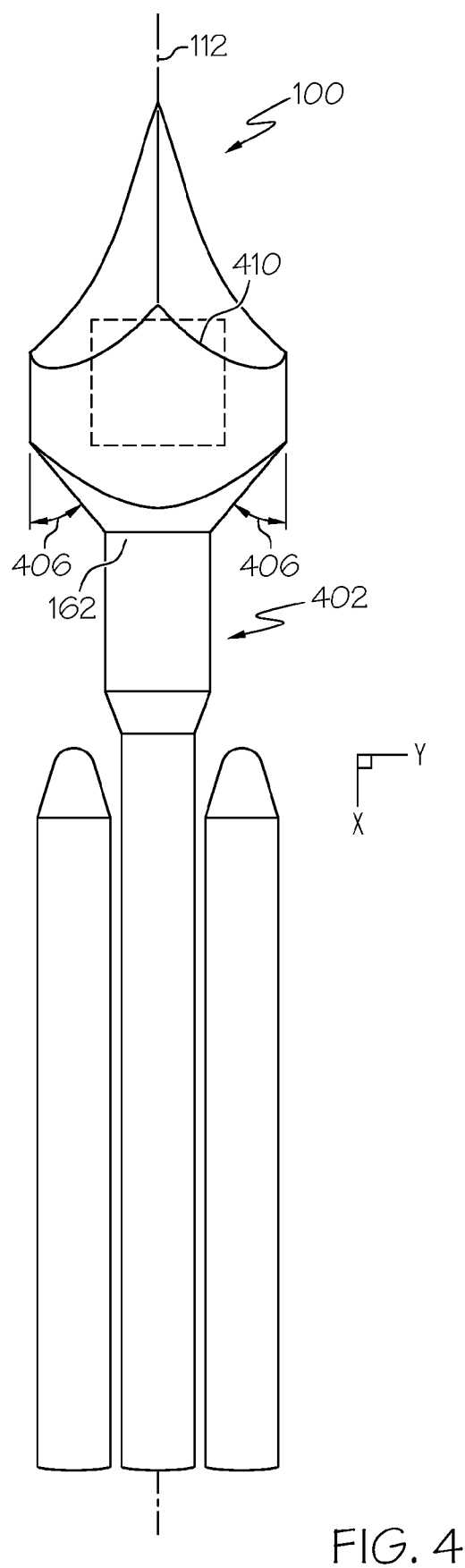
FIG. 4 depicts an exemplary fairing attached to a generally cylindrical body and configured to house a payload.

In one embodiment, fairing 100 includes a chamber configured to enclose a payload (e.g., 410 in FIG. 4). The size and nature of such payloads vary greatly. Thus, it is common to design fairing 100 to accommodate a specific payload while at the same time satisfying certain aerodynamic, thermal, vibrational, and force (e.g., axial, shear, bending, and torsion) criteria.

Fairing 100 may be fabricated in accordance with conventional processing techniques. In one embodiment, for example, the entire fairing structure consists of multiple (e.g., two) matching components that are interconnected in any desired fashion—e.g., through the use of mechanical joints such as destructible or frangible joints. Such components or panels are determined by first creating a three-dimensional digital model of a fairing based in part on geometrical characteristics of the payload, but also based on any number of other design criteria. In one embodiment, for example, matching halves defined by the X-Y axis are formed and joined together. In another, the matching halves are defined by the X-Z axis. Fairing 100 may be fabricated using a variety of materials. In one embodiment, for example, a composite material, such as carbon fiber, is used.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A fairing having a nose section defined by four generally concave trianguloid surfaces, each extending from a middle section to a common apex intersecting a longitudinal axis, each adjacent pair of trianguloid surfaces intersecting at four respective edges, wherein the four trianguloid surfaces are asymmetrically disposed with respect to rotational symmetry about the longitudinal axis, and wherein the edges have a sharpness that varies between the common apex to the middle section.

2. The fairing of claim 1, wherein the middle section intersects and is axially aligned with the nose section and has a constant elliptical cross-section along a plane orthogonal to the longitudinal axis.

3. The fairing of claim 1, further including a conical aft section that intersects and is axially aligned with the nose section.

4. The fairing of claim 1, wherein the edges between the adjacent pairs of the trianguloid surfaces are incurvate.

5. The fairing of claim 1, wherein at least the middle section further includes an interior chamber configured to accept a payload.

6. The fairing of claim 1, wherein the sharpness of the edges increases toward the apex.

* * * * *